UNITED STATES PATENT OFFICE.

ALEXANDER E. OUTERBRIDGE, JR., OF PHILADELPHIA, PENNSYLVANIA.

SAND CORE FOR MOLDS FOR CASTING METALS AND PROCESS OF THE MANUFACTURE OF SUCH CORES.

14,828. Specification of Reissued Letters Patent. Reissued Mar. 30, 1920.

No Drawing. Original No. 1,324,208, dated December 9, 1919, Serial No. 309,381, filed July 8, 1919. Application for reissue filed January 7, 1920. Serial No. 350,023.

*To all whom it may concern:*

Be it known that I, ALEXANDER E. OUTERBRIDGE, Jr., of Chestnut Hill, Philadelphia, in the county of Philadelphia and State of Pennsylvania, have invented certain new and useful Improvements in Sand Cores for Molds for Casting Metals and Processes of the Manufacture of Such Cores, whereof the following is a specification.

In the manufacture of sand cores, various binding ingredients have heretofore been employed, all of which are attended with some disadvantages, either in the initial process of forming the core, or in the preservation of the core after completion and during use, or in the recovery of the sand for subsequent use.

The present invention has for its object the minimizing of these disadvantages and consists in the discovery that certain substances which may be classified as containing "caseins," whether of animal or vegetable origin, when employed under proper conditions, can be utilized as binding materials for the sand of a core, and when so employed develop peculiar and valuable properties in such core. I believe that notwithstanding the use of the so-called commercial casein compounds, for many purposes which might, in a certain sense, be said to resemble that of glue, its peculiar availability as an ingredient for the manufacture of sand cores, has not been suspected, and that I am the first to discover and utilize its specific properties in that relation.

Casein-containing compounds of the character referred to are usually manufactured by formulæ which are not divulged, the basis of some being what may be considered as normal casein, made from milk, and of others a substance resembling it in physical qualities, but which is obtained from leguminous products such as peas, beans, etc., and is sometimes termed "legumin" or "vegetable casein."

Associated, or combined with the "casein" ingredient (actual or so-called) various substances are employed in these commercial articles, for the purpose of enhancing the solubility of the compound for initial application, or of advantageously modifying its properties when in a dried and indurated state. Among these ingredients are, hydrated lime, or other alkaline substance, and, according to the formula of the United States Department of Agriculture, Forest Service, silicate of soda, but it will be understood that the present invention is not restricted to the use of any particular adjunctive ingredients in association with the casein, actual or so-called, provided the compound has the solubility adapted for proper commingling with the sand, the coherence requisite for maintaining the core structure, and the property of becoming indurated and substantially non-hygroscopic when dried in association with the sand.

By prolonged investigations and experiments I have found that the desired properties are found in several of the commercial compounds of the character referred to, three of these being believed to be based upon "casein" of animal origin, and designated commercially as "Casco," "Napco" and "Certus" respectively, a fourth being believed to be based upon "vegetable casein" and being commercially designated as "Perkins vegetable glue." I mention these by name simply in order to indicate typical instances of commercial casein-containing compounds, known to me by actual test as appropriate, but without restrictive intention.

A typical method of procedure which I have found successful is as follows:

I prepare a solution of "casein" of the proper character for intimate commingling with and coating the sand grains, preferably by first making a thick paste by stirring the animal or vegetable "casein"-containing a compound in water, which may be even cold. I then reduce the consistency of this paste by adding sufficient water to make a relative mobile or fluent material, comparable to thin mucilage, and then diffuse this liquid throughout a mass of either sharp sand alone, or sand with a moderate amount of flour, pulverized clay, or other similar finely divided solid material, although I prefer to omit these last mentioned substances.

The proportions may vary, but a fair average proportion consists in one pound of "casein"-containing compound, such as those mentioned, diluted with two or three pounds of water, to one hundred pounds of sand. The ingredients should be commingled with great thoroughness so that, as far as possible, each grain of the sand may become coated with a film of the "casein" solution, but without any substantial excess of the latter.

The mass, while still in a moist condition, can be molded to the proper form even without tamping. It is then dried and indurated, preferably by the application of artificial heat, although under some circumstances, and particularly with cores of relatively small size, ordinary air-drying at normal temperatures may attain this result. With relatively large cores, or where time is important, I prefer to place the core in an oven and bake it at a moderate temperature, say 350° F., the time depending upon the size of the core, say from one to twelve hours.

When the core has set in its final form, and is thoroughly dry and indurated, it is ready for immediate use, or may be preserved.

I have found that the process and product above described has many advantages, notably, as follows: The relatively thin "casein" solution, which is adequate for the purpose, can be intimately and uniformly commingled with the sand with great facility, and the moist mass is remarkably coherent, so that the shaping of the core and its transportation to the baking furnace are facilitated.

The finished cores are non-hygroscopic and can be preserved without deterioration for an indefinite time; in use they are comparatively free from any tendency to evolve gas, which, in the case of cores of the ordinary character, is liable to impair the casting; they are adequately coherent, especially as compared with the so-called oil cores now largely used; finally, after use at the high temperature characteristic of the casting process, the sand of the core, instead of assuming a stone-like condition, possesses such mobility that it can be stirred and poured out like ordinary dry sand, and can be used over and over again without any preparatory treatment whatever.

In ordinary forms of sand cores, it is necessary to break up and pick out the hard lumps and grind them into powder, in case it is desired to use the material over again, and with the so-called oil sand cores, it is customary to put the lumps into a furnace and burn out the unconsumed oil in order to restore the same into a condition proper for use.

By the employment of my present invention, not only is a superior core obtained, but the immediate availability of the sand for repeated use is very desirable.

I use the term "casein" in a broad sense, to denote the basis of such compounds as those hereinbefore mentioned, whether such basis be of animal or vegetable origin, and without reference to its association with other ingredients. Hence it will be noted that the expression is not employed with the limitation characteristic of strict chemical nomenclature.

Having thus described my invention, I claim:

1. A dry and indurated core comprising molding sand, in combination with "casein" intimately intermingled with the solid particles and forming a coherent mass.

2. The hereinbefore described improvement in the process of making sand cores for castings, which consists in intimately commingling with molding sand, a charge of "casein" in solution; forming the combined materials into shape while in a moist condition; and then drying and indurating the shaped mass, substantially as set forth.

In testimony whereof I have hereunto signed my name at Philadelphia, Pennsylvania, this sixth day of January, 1920.

ALEXANDER E. OUTERBRIDGE, JR.

Witnesses:
JAMES H. BELL,
E. L. FULLERTON.